United States Patent [19]
Victor et al.

[11] Patent Number: 5,640,566
[45] Date of Patent: Jun. 17, 1997

[54] METHOD OF FORMING AN EDITOR

[75] Inventors: Kenneth E. Victor, Mountain View; Peter E. Alley, Saratoga; Scott C. Collins, Cupertino; Danny L. Dishon, Menlo Park; Benjamin W. Sharpe, San Francisco, all of Calif.

[73] Assignee: Apple Computer, Inc., Cupertino, Calif.

[21] Appl. No.: 283,570

[22] Filed: Aug. 1, 1994

[51] Int. Cl.⁶ .................................................. G06F 15/163
[52] U.S. Cl. ................................. 395/701; 395/326
[58] Field of Search .................................. 395/650, 700

[56] References Cited

U.S. PATENT DOCUMENTS

| | | | |
|---|---|---|---|
| 5,392,390 | 2/1995 | Crozier | 395/161 |
| 5,519,606 | 5/1996 | Frid-Nielsen et al. | 364/401 |
| 5,522,089 | 5/1996 | Kikinis et al. | 395/893 |

*Primary Examiner*—Kevin A. Kriess
*Assistant Examiner*—John Q. Chavis
*Attorney, Agent, or Firm*—Hickman Beyer & Weaver

[57] ABSTRACT

A method of creating an editor that is executed on a first computer system is disclosed in which the editor is arranged to facilitate the editing of data from a first application program executed on a second computer system without requiring that the first application program run on the first computer system. The method includes the steps of creating a display info array that identifies the data fields that may be displayed in a data browser window portion of the editor and creating an edit info array that identifies the data fields may be edited in a detail window portion of the editor. In a preferred embodiment, validation scripts that define the types of data that may be accepted in each of the data fields that is set forth in the edit info array are identified, with the validations scripts forming a portion of the edit info array. This arrangement facilitates editing data using a foreign computer system. Initially, a meta database is created on the first computer system and the meta database is synchronized with a database on the second computer system. An overview browser window of records in the meta database is then displayed on a screen of the first computer system when the meta database is selected. When a user selects a particular record for editing, a detail editing widow of a selected meta database record is displayed on the screen of the first computer system. Thereafter edits inputted into the first computer system are received and the records in the meta database are changed accordingly. Finally, the meta database is resynchronized with the database on the second computer system to transfer the edits to the first computer system.

6 Claims, 10 Drawing Sheets

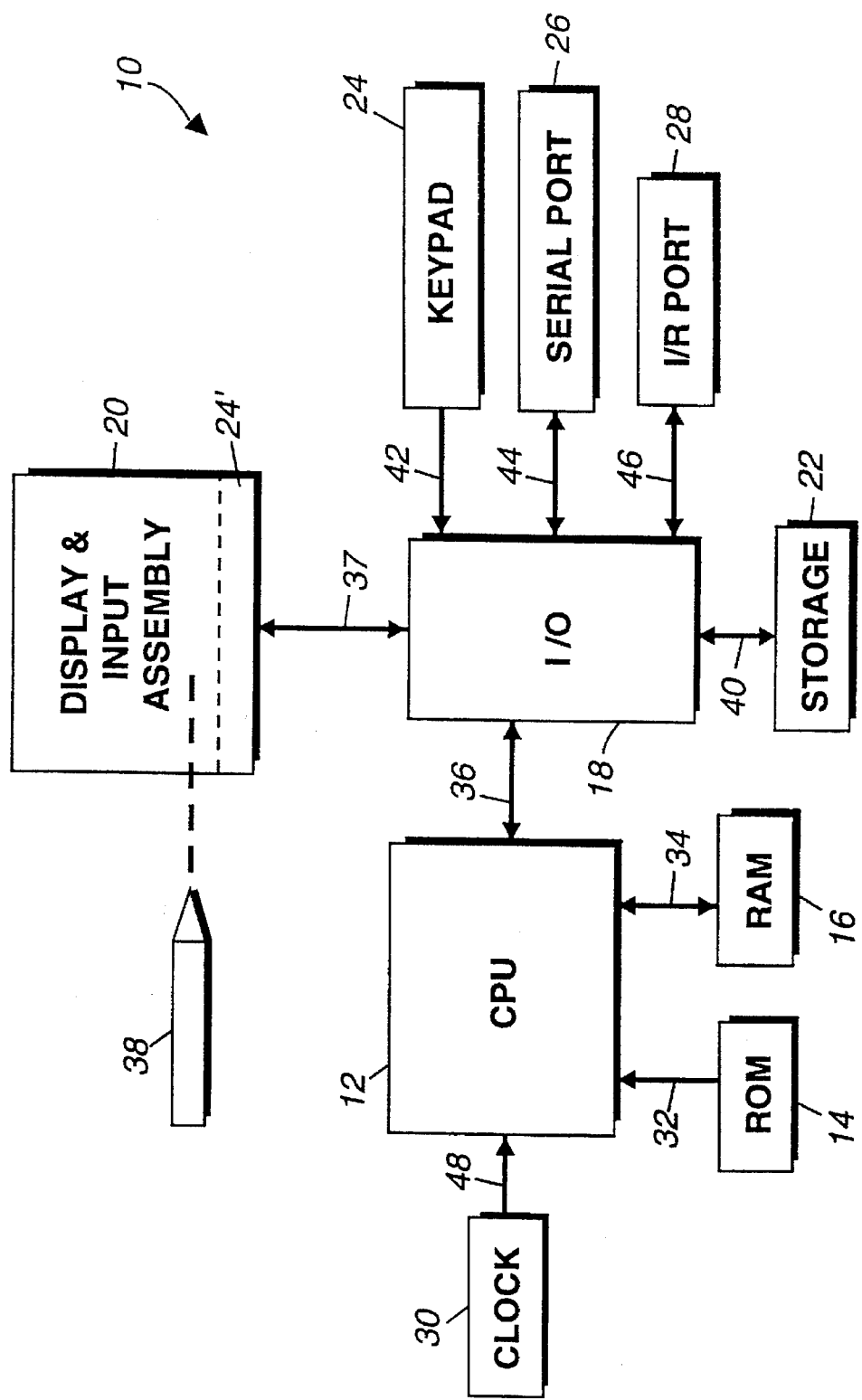

METHOD OF FORMING AN EDITOR

BACKGROUND OF THE INVENTION

The present invention relates generally to the creation of editors and translators that are executed on a first computer platform but are arranged to edit or transfer data from an application program that is executed on a second computer platform that is potentially incompatible with the first computer platform. In one aspect, an editor/translator development tool structure and method is provided to assist application program developers in the creation of editors for editing data from an application program designed to run on the second computer platform and translators for importing and/or exporting data for their application programs, wherein the editors and translators are arranged to run on the first computer platform.

In recent years there has been a great deal of interest in small (often handheld) pen-based computer systems that offer the convenience of ready portability yet the power of a sophisticated computer system. Examples of such systems are the personal digital assistants (PDA's) such as the Apple Newton PDA's that are currently available on the market. In pen-based systems, the primary input mechanism is typically a stylus which can be used for "writing" directly on a position sensitive screen. Although this is an very handy input mechanism for many needs, in some cases it would desirable to provide a mechanism for permitting application data to be entered and/or edited using a more conventional keyboard based desktop computer or the like. One reason for this is that in some situations, inputs and edits can be made more quickly on a keyboard based system. It would also be desirable to provide a translating mechanism that facilitates the importation of large blocks of records (such as records in an address list) from a given personal computer application program into a corresponding or complementary application program on the pen based computer system. Accordingly, the availability of development tools that facilitate the creation of editors, importers, and exporters that are executed on a first computer platform (such as a desktop type computer system) in order to manipulate data intended for use in a second, potentially incompatible computer second (such as a pen-based computer system) is highly desirable. Accordingly, the present invention is directed at development tools and methods that can be provided for and used by translator developers to make their development more efficient.

SUMMARY OF THE INVENTION

To achieve the foregoing and other objects and in accordance with the purpose of the present invention, a method of creating an editor that is executed on a first computer system is disclosed in which the editor is arranged to facilitate the editing of data from a first application program executed on a second computer system without requiring that the first application program run on the first computer system. The method includes the steps of creating a display info array that identifies the data fields that may be displayed in a data browser window portion of the editor and creating an edit info array that identifies the data fields may be edited in a detail window portion of the editor. In a preferred embodiment, validation scripts that define the types of data that may be accepted in each of the data fields that is set forth in the edit info array are identified, with the validations scripts forming a portion of the edit info array. In another embodiment, an export info array is also created that identifies the data fields that may be exported.

In another embodiment, the display and edit info array creating steps are accomplished as part of said application program executed on the second computer system thereby permitting the dynamic creation of an editor suitable for running on said first computer system. In this case, the display and edit info arrays may be transferred to the first computer program as part of a synchronizing step.

In another aspect of the invention, a method of editing data on the first computer system is provided. Initially, a meta database is created on the first computer system and the meta database is synchronized with a database on the second computer system. An overview browser window of records in the meta database is then displayed on a screen of the first computer system when the meta database is selected. The data fields that are available for display in the overview browser window are identified in a display info array. When a user selects a particular record for editing, a detail editing widow of a selected meta database record is displayed on the screen of the first computer system. The data fields that are editable on the first computer system are identified in an edit info array. Thereafter edits inputted into the first computer system are received and the records in the meta database are changed accordingly. Finally, the meta database is resynchronized with the database on the second computer system to transfer the edits to the first computer system.

BRIEF DESCRIPTION OF THE DRAWINGS

The invention, together with further objects and advantages thereof, may best be understood by reference to the following description taken in conjunction with the accompanying drawings in which:

FIG. 2b is a block diagram of a desktop style computer system of the type that is

DETAILED DESCRIPTION OF THE INVENTION

For simplicity and clarity, the invention will be described in the context of a system wherein a pen-based computer system (such as a handheld personal digital assistant (PDA)) is backed up by storing data on a desktop type personal computer. The browsing, editing and import/export operations are described as occurring on the personal computer, while the application programs that generally handle and often create the data are executed on the PDA. This is one important application of the invention for the reasons discussed in the background section of this application. However, it should be appreciated that the roles could readily be switched and that the invention may be applied to any pair of computer systems that utilize distinct operating systems.

The present invention was developed as part of the support for Apple Computer's Newton line of personal digital assistants (PDA's) which are currently on the market. The Newton Programmer's Guide entitled: *Newton Toolkit*, published in 1994 by Apple Computer describes several of the features of the invention and is incorporated herein by reference in its entirety. The most relevant chapter of the *Newton Toolkit* guide is Chapter 16 which deals with "Newton Connection", which is an application that runs on a Macintosh or Windows based computer to allow users of a PDA to backup data and programs from a PDA on the personal computer. This is important since in many PDA's, RAM is used as mass storage for storing user application programs and/or data. The RAM 16 is provided with a backup battery to prevent the loss of data even when the pen-based computer system 10 is turned off. However, there is always the risk of corrupting data.

The Connection application also allows the user to import new data on the personal computer, convert it to a format that can be used by the PDA and then download the converted data to the PDA. Further, it permits the exportation of data from the PDA, as well as the browsing and editing of PDA data on the personal computer. The editing and importation functions are desirable since, as discussed above, in many situations it may be more convenient for a user to enter new data and/or edit existing data using a standard keyboard interface that may not be available for the PDA. Further, it may be desirable to load data directly from an application program that operates on the personal computer. The Newton Connection Software is further described in the Newton Connection Kit for Macintosh User's Guide published in 1993, as well as the Newton Connection 2.0 Update published in 1994 by Apple Computer. Both of these user guides are also incorporated herein by reference in their entirety.

Figure 1:
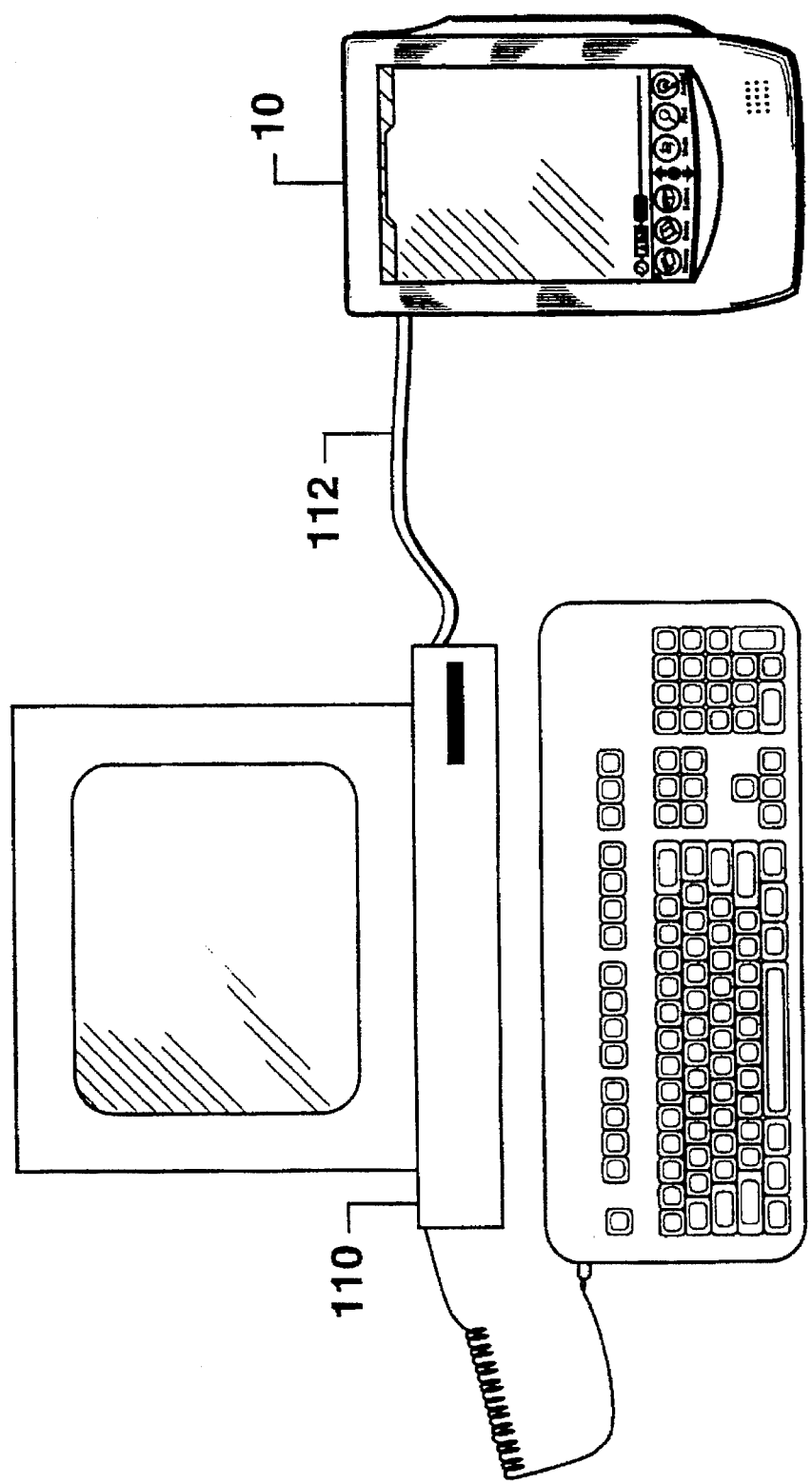
FIG. 1 is a is a block diagram illustrating a connection between a pen-based computer system and a desktop style personal computer system.

Referring initially to FIG. 1, the pen-based computer system 10 may be arranged to communicate with a conventional personal computer 110 such as a Macintosh or a personal computer that runs a Windows based operating system via serial cabling 112 which connects as serial port on the first computer (PDA) 10 to a serial port on the second computer (desktop) 110. The application described herein runs on the personal computer (PC) 110 and permits a user to browse and edit backup records and files that are stored on the personal computer. In the described embodiment, the records are stored in a format that may be directly read by the PDA 10. Thus, they are stored as PDA records. A method and arrangement for backing up, synchronizing and archiving data stored on the pen-based commuter system is described in copending application Ser. No. 08/072,606 filed Jun. 2, 1993 and entitled: Synchronizing and Archiving Information Between Computer System, which is incorporated herein by reference in its entirety. This system is embodied in the Newton Connection software which is described above. The backup files used for this synchronization (referred to herein as the meta database) may be arranged to be edited and browsed directly on the personal computer using the techniques of the present invention. After editing, the user can simply resynchronize the meta database with the PDA's database to transfer the edits back to the PDA. In this way, edits and/or additions may be made on either the PDA itself or on the personal computer.

Figure 4:
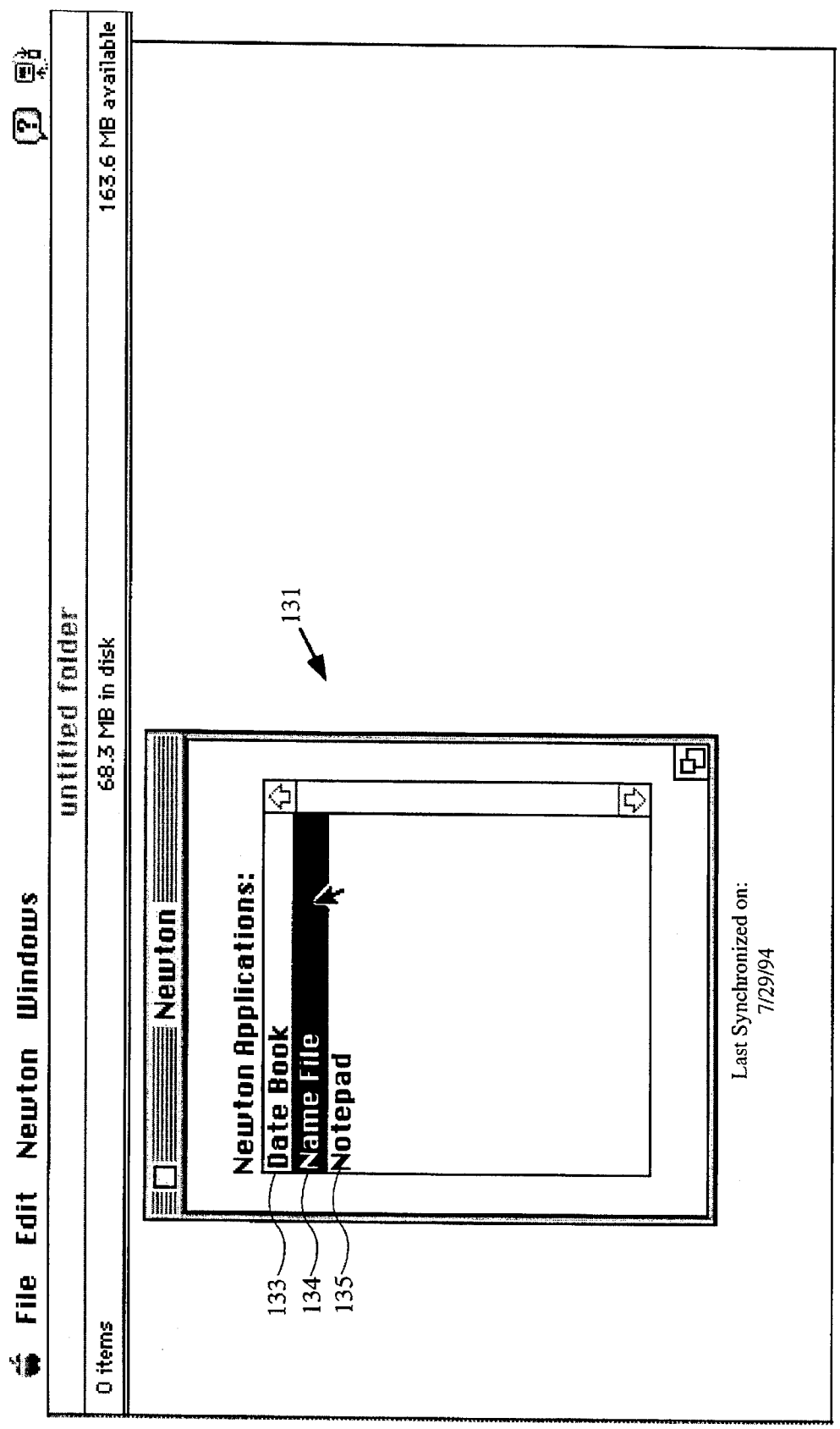
FIG. 4 a diagrammatic representation of an application listing window on the personal computer that displays the available meta data files.
Figure 5:
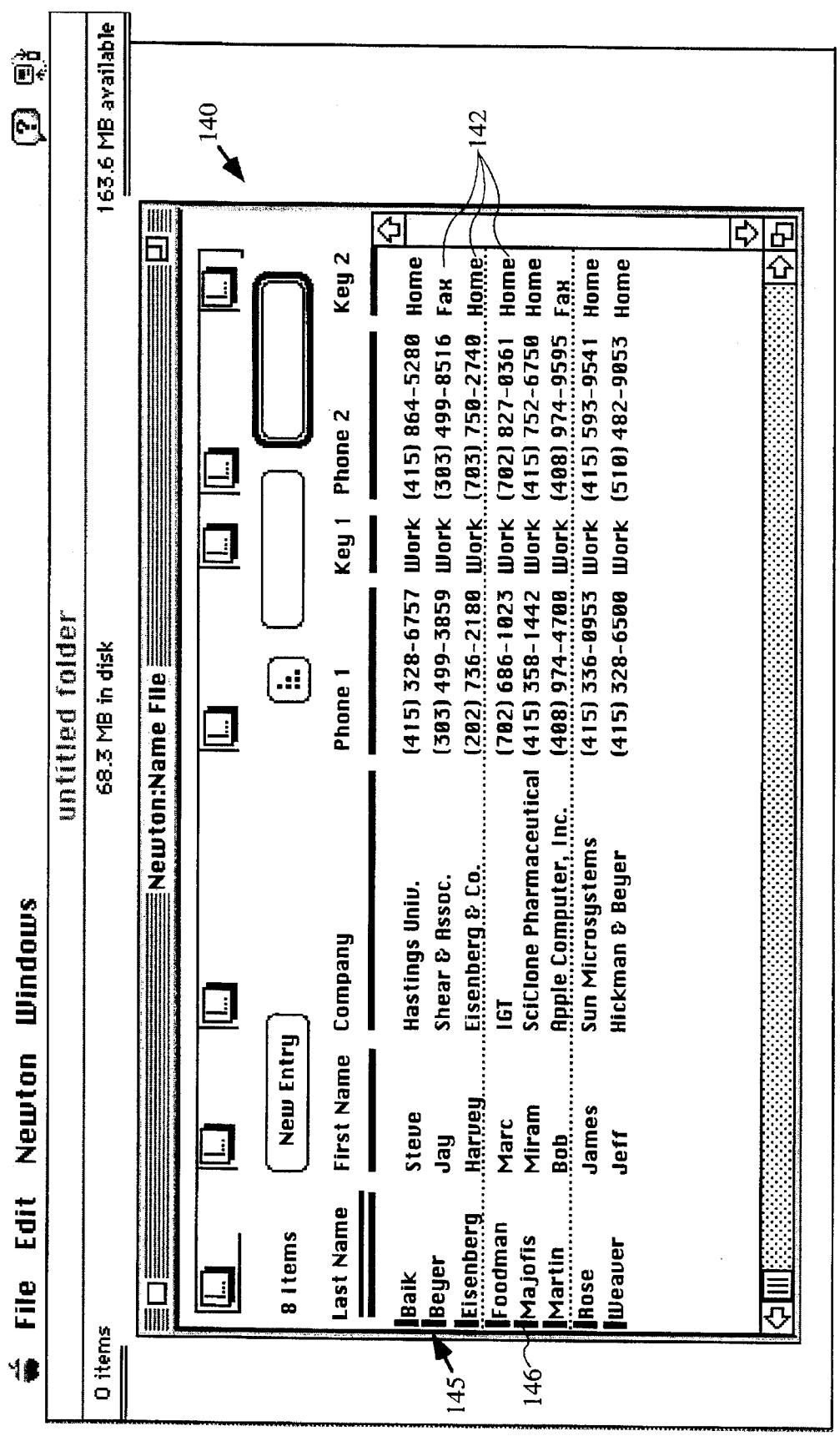
FIG. 5 is a diagrammatic representation of an overview window on the personal computer that displays an address book meta data browser.

The meta database files are identified by name and may be opened in any conventional manner which is available to the PC 110. By way of example, when the meta database file is opened, an application listing window 131 may be displayed on a display screen of the PC 110 as illustrated in FIG. 4. In the embodiment shown, the meta database file is referred to as "Newton" and data from three applications is available for viewing. These include a Date Book 133, an Address Book (labeled Name File) 134 and a Notepad 135. Of course, the actual number of applications that are available for viewing will depend entirely on how many applications that user has backed up. The desired application file may be opened by selection in a conventional manner. When a particular application file is opened, a meta data browser overview window is displayed which shows an overview of records in the selected application file. By way of example, in the embodiment shown, the user has selected the Address Book meta data file 134. Thus, a browser overview window 140 is opened which displays an overview of up to a window full of record entries 142 that are contained in the selected application file. In the embodiment shown, each record is displayed on a single line, although, of course, they could be displayed in other formats, such as in columns, on multiple lines, in blocks, etc. The overview window 140 may be navigated in any suitable standard manner for the computer system it is displayed on such as the scroll bars shown in FIG. 5. If the user is merely browsing, this may be sufficient, on the other hand, in situations where the user wishes to edit a particular record (such as record 145), or view a particular record in more detail, the user may select one of the entries. Again, the selection may be made in any manner suitable for the particular computer system in use, such as clicking on a record bar 146 displayed on the left side of each row; double clicking on an entry in the row, etc.

Figure 3:
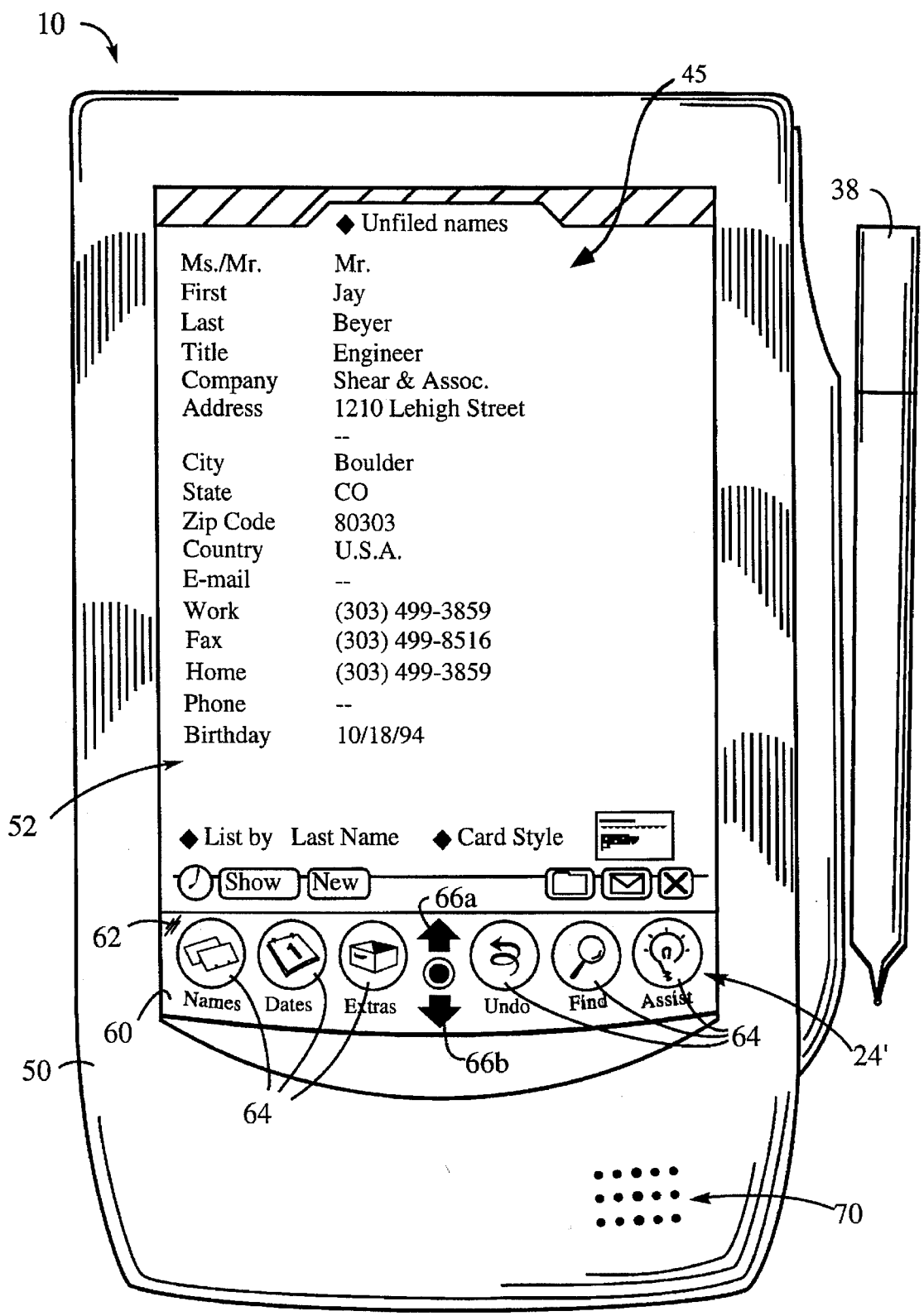
FIG. 3 is a top plan view of the screen, case, keypad, and stylus of the computer system of FIG. 2 with the screen displaying an address book record.
Figure 6:
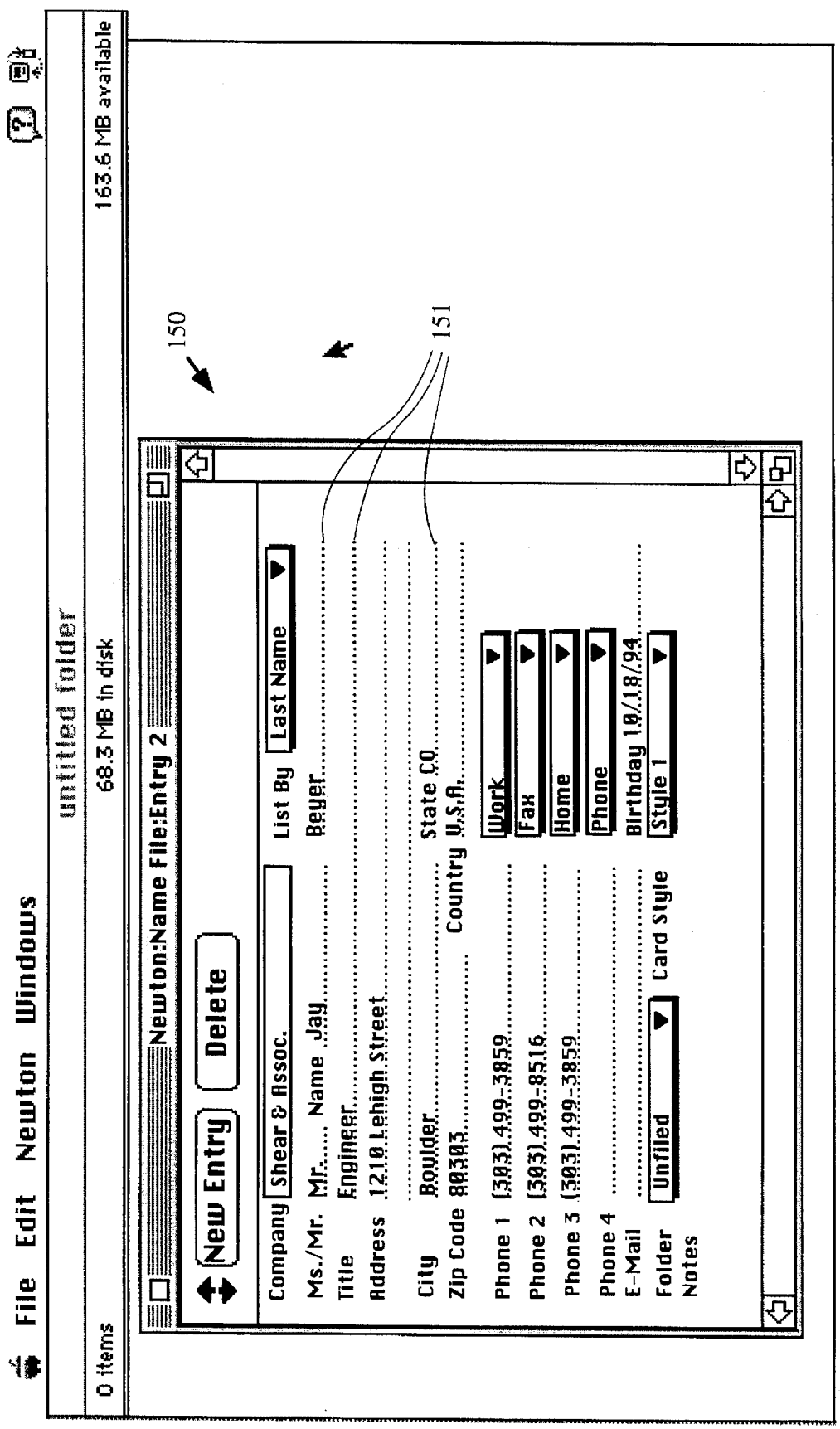
FIG. 6 is a diagrammatic representation of a detail window on the personal computer that displays the address book record of the address book meta data file.

When a particular meta-data record 145 is selected, a detail widow 150 that displays the selected record of the meta data file is opened and displayed on the screen of computer 110 as illustrated in FIG. 6. The user can then enter data into fields 151 of the record using the appropriate available input mechanism, as for example a keyboard, etc. The meta data record 145 displayed on the personal computer 110 as illustrated in FIG. 6 corresponds to the data record 45 displayed on the PDA 10 as illustrated in FIG. 3. As can be seen by comparing those two figures, the records need not be displayed in the same layout, the labels for the fields may vary and some of the fields in the data record 45 may be unavailable or translated in the meta data record 145. As will be discussed in more detail below, the application developer may control the fields that are available for editing, the labels etc.

Figure 7:
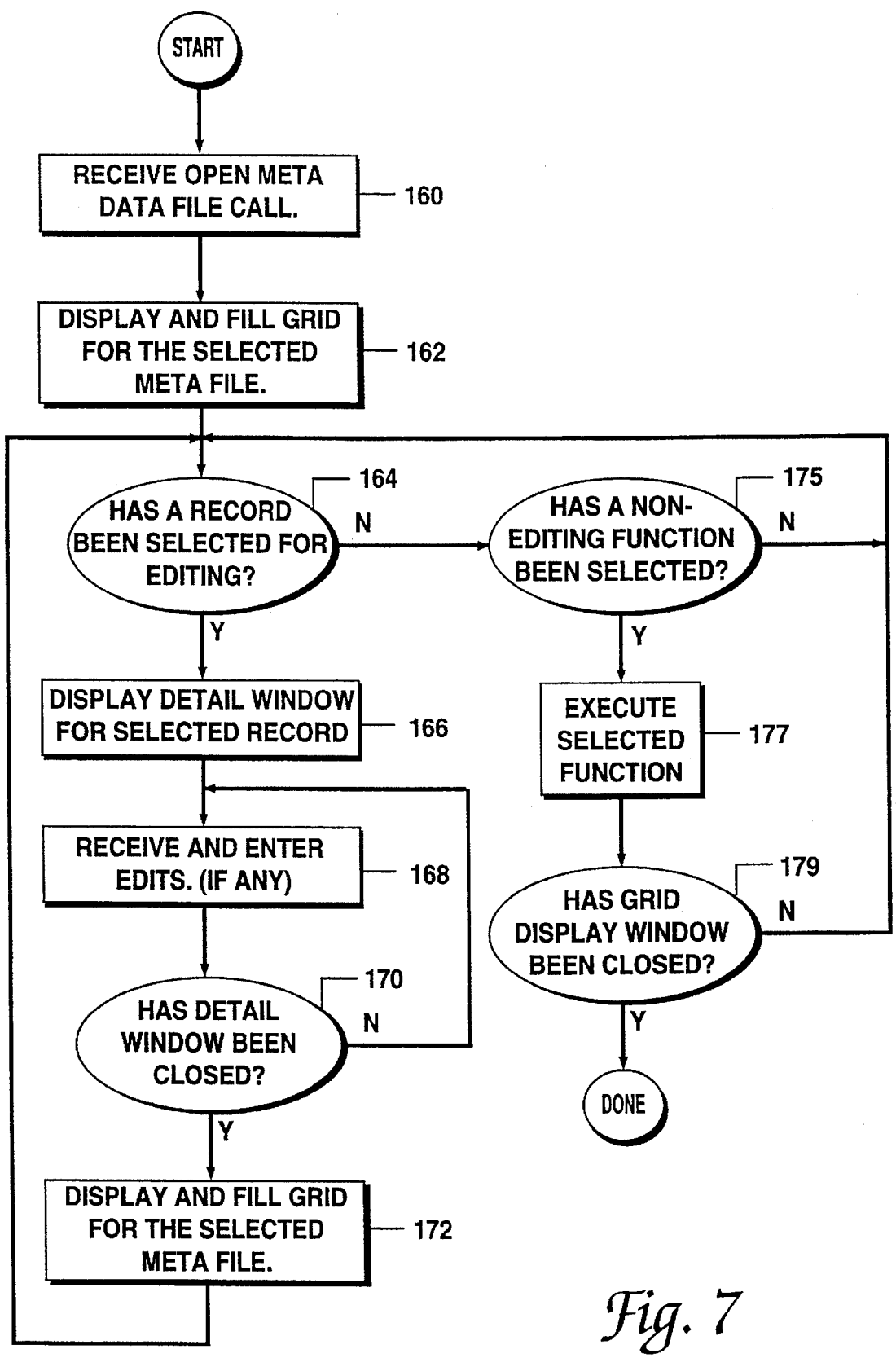
FIG. 7 is a flow diagram of a method of navigating a meta data file and editing records therein from a user's perspective.

Referring next to FIG. 7, a general process suitable for editing an entry will be described. Initially, in step 160 a call to open a particular meta data file is received when the user selects a particular meta data file 133–135 for review (as for example by selecting an entry in the application listing window 131). The overview window 140 (as for example the overview window illustrated in FIG. 5) is then displayed with a record grid that displays the contents of up to a window full of records from the meta data file. The system then waits for the entrance of a command from the user as illustrated in steps 164 and 175. If it is determined that the user has selected a record for editing (in step 164), a detail widow for the selected record is displayed in step 166. By way of example, one such detail window is illustrated in FIG. 7. This detail window illustrates the meta data record that corresponds to the record illustrated on the PDA 10 in FIG. 3. As can be seen therein, there is no need for the layout of the meta data record 150 to replicate the layout of the corresponding PDA record 45, although when all of the fields are editable and displayed, they would include the same fields as is illustrated.

When the detail window is open, it receives and the system enters any edits made to the record by a user. Step 168. Edits may be received as long as the detail window is open. When a close the detail window command is received in step 170, the edits are added to the official record and all of the strings of the record being closed are validated in step 172 to insure that they constitute appropriate data for the fields that they have been entered into. If any of the entries are invalid, the user is so informed and given the opportunity to correct the entry. Alternatively, the entry will simply be ignored. After the closed record has been validated and recorded in the active meta data file, the logic returns to step 164 where additional record selections are looked for.

If a non-editing function or command has been selected or entered, the command is detected in step 175 and executed in step 177. Of course a wide variety of functions including import and export functions may be permitted. If the command or function closes the browser window 140, as detected by step 179, the editing process is complete. Alternatively, when the browser window has not been closed, the logic returns to step 164 to await the receipt of the next record selection or other editing command.

Figure 8:
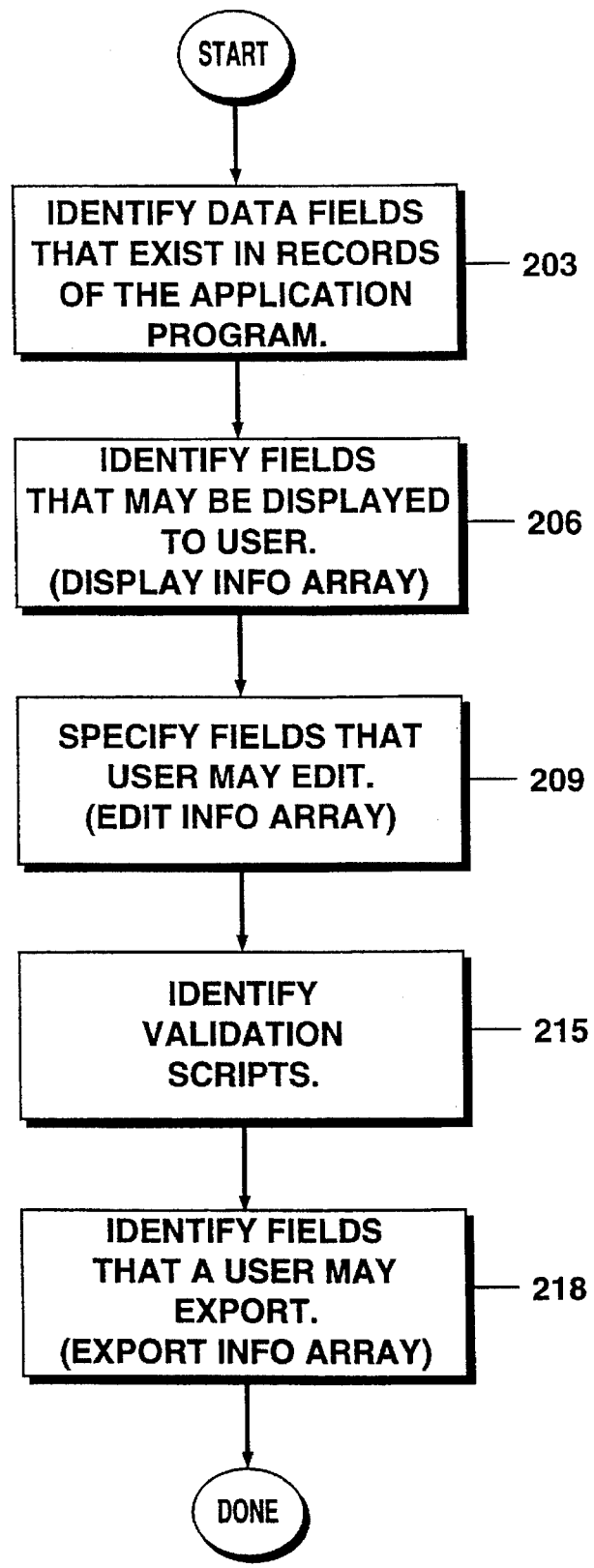
FIG. 8 is a flow diagram of a method of defining the structure of meta data files from the standpoint of an application developer.

To permit users to take advantage of the described editing interface, an application developer must define the meta-data structure for their application program. A general process suitable for use by a developer to define a meta data structure suitable for use with their application program will be described with reference to the flow chart of FIG. 8. As seen therein, the data fields that exist in records of the developer's PDA application program are initially identified in step 203. There is no restriction on the number of fields that may be provided. Rather, the number of fields will simply correspond to the number of fields provided in the application program itself.

The fields that may be displayed to the user in the browser are then identified in step 206. This identification includes identifying the path to each data field, identifying the type of data in each field, and providing a user understandable name or label for each field. The identification of the data in each field is merely the identification of the type(s) of data that the associated field may hold, as for example, a string, an integer, an array, a frame etc. In the event that no data type is specified, a string is used as the default. The label is a string that is used as the column header for the field in the data browser overview window 140. The displayable fields are listed in an array referred to herein as a "Display Info Array". The initial display order of the various fields in the browser overview 140 is dictated by the order of the entries in the Display Info Array. That is the first entry is displayed first, the second is displayed second, etc. The user is permitted to alter the display order during review of the data in the browser. This can be accomplished in a variety of manners. By way of example, in pointer based systems, the grid column (or row, or block) headers may be dragged and deposited at alternative locations to move the location of the associated column. The system can be arranged to either display the default each time that the data browser is opened or recall the user specified display order and display the fields in the last used order.

The fields that may be edited by a user are also identified as illustrated in step 209. An indication of the editable fields is placed in an array referred to herein as the "Edit Info Array". The Edit Info array defines how a text frame will appear in the Detail Window 150. Thus, each array element describes how one slot from the text entry will appear in the Detail Window 150. That is, each array element describes one field in the Detail Window. Each array element can be one of: a frame, the name of a slot, or a symbol which indicates a dividing line between items in the array. The information may include a symbol that is the name of a slot in the record; a label which is a string that is used as a displayed field label; a size indicator which indicates the initial width of the column, a symbol that indicates the type of data in the field. The default width of the leftmost column for each line in the Detail Window 150 may be separately provided.

Once the editable fields have been identified, the types of data that are acceptable for those fields must be indicated. As discussed above, when a user makes edits to a record, the entries must be validated to insure that they constitute acceptable data. To facilitate this validation, the types of data (or scripts) that constitute valid data for the various fields are identified in step 215. This can be done as part of the Edit Info Array. These acceptable data identifiers are referred to herein as the "Validation Scripts." The appropriate Validation Scripts will, of course, vary to a great extent in accordance with the particular system and may, for example include strings, integers, arrays, numbers, symbols, frames, arrays of strings etc. Normally, the validation scripts available to a developer will be limited to checking the type of data. However, it should be appreciated that developers may provide more precise requirements, such as the requirement that an entry must be within a specific numeral range.

Figure 9:
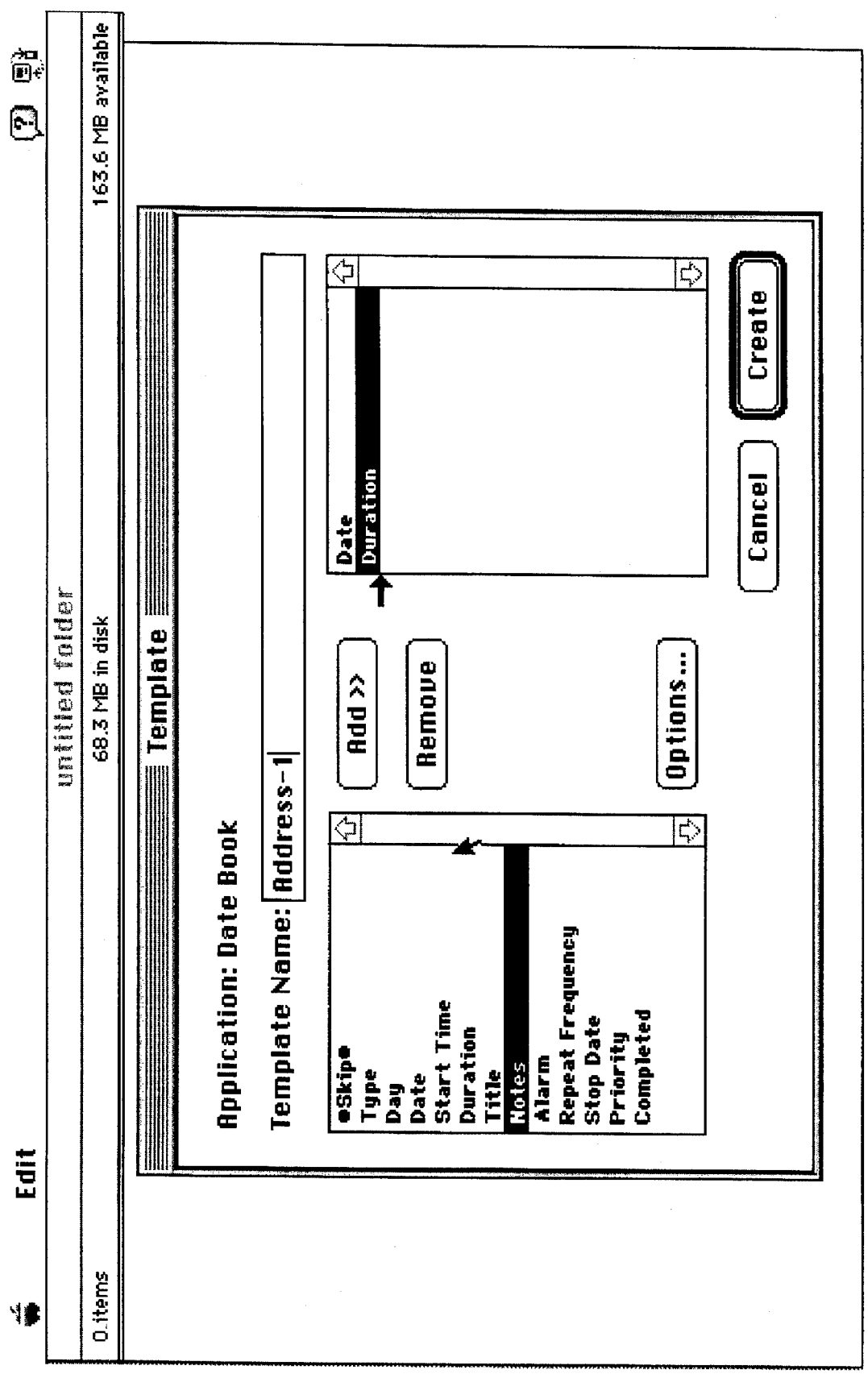
FIG. 9 is a flow diagram of an export template editing dialog box.

Another feature of the described connection mechanism is to permit the exportation of information from records in an application program. To facilitate this, the fields that a user will be permitted to export must first be identified in step 218. This is done using an "Export Info Array". This array is also arranged to define the fields that appear in a template creation dialog box. When a user chooses a Create Template or an Edit Template command, the fields in the Export Info array dictate the fields that appear in the dialog box as seen in FIG. 9. A user can thus define a custom template for displaying the meta data. The custom template can have any number of the fields that are available and the fields may be sized as desired by the user.

Conversion mechanisms are then provided for converting each of the internal data fields into strings that are suitable for export as illustrate in step 221. Data can be moved to and from External files in two formats. A native format, which is a temporary file that is expressly for translation to a third-party application file, such as a spreadsheet file, data-base file, PIM file, calendar file, etc. A second format is a conventional text format in which data from individual entry slots are separated by a designated character (which by way of example, is usually a tab). To facilitate importation and exportation of such data, a variety of import and export functions may be called. Representative import and export functions are described in the above referenced Newton Toolkit programmer's guide.

As will be appreciated by those skilled in the art, the described system permits a user to editing the database of a first computer (as for example a PDA) by first creating a synchronized meta database on a second computer (using, for example, the synchronizer described in copending application Ser. No. 08/072,606 filed Jun. 2, 1993 and entitled: Synchronizing and Archiving Information Between Computer System). The synchronized meta database can then be edited on the second computer (which may be a personal computer) as described above. The edited meta database can then be resynchronized with the personal computer's database which serves to transfer the edited information back onto the first computer.

The simple structure of the edit and display info arrays provides the possibility of dynamically creating these arrays within an application program running on the PDA itself. The dynamically created arrays can then be passed to the personal computer as part of the synchronization. This facility permits the development of meta databases that are customized to user defined record structures.

Figure 2A:
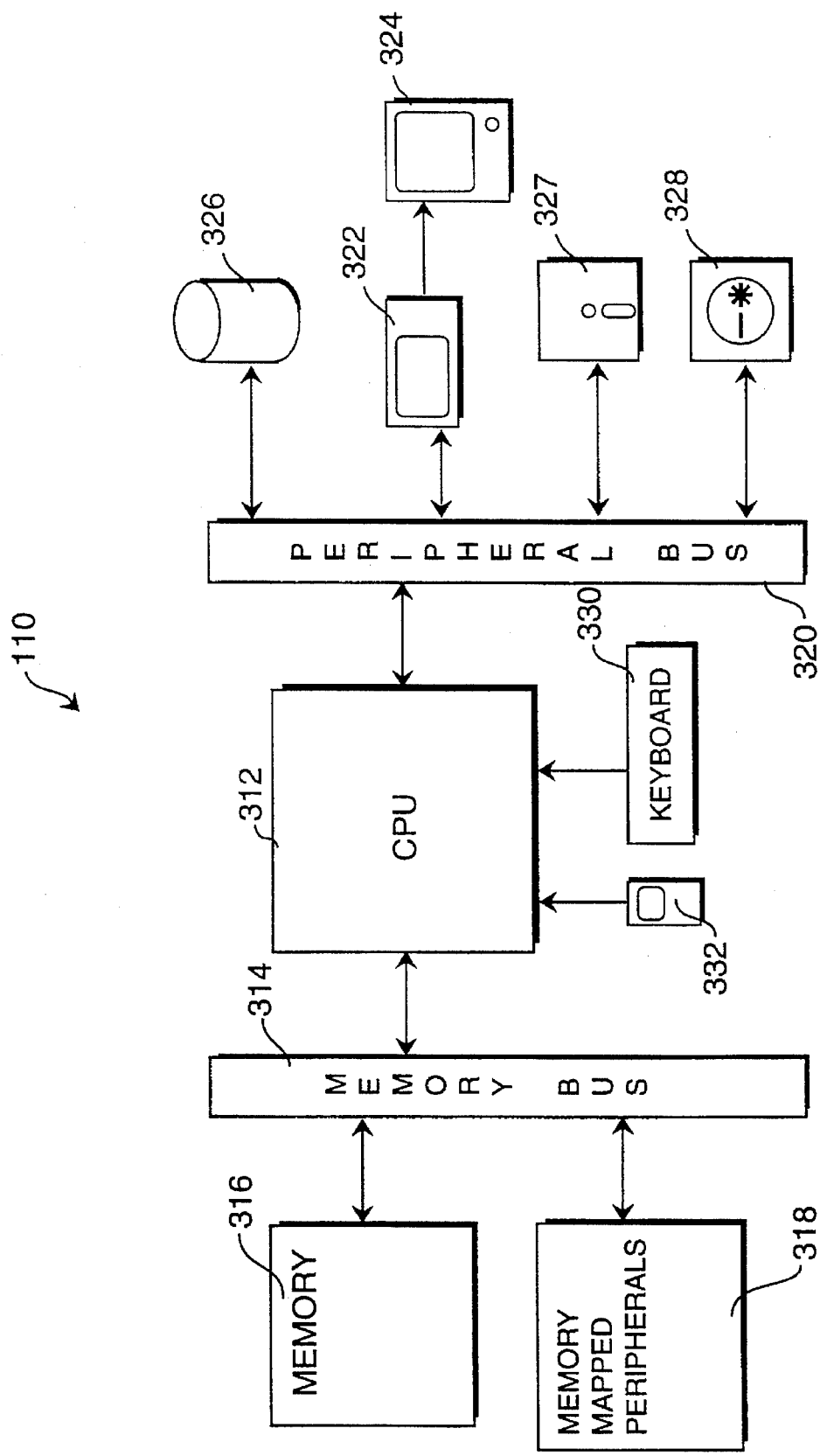
FIG. 2a is a block diagram of the architecture of a pen-based computer system of the type illustrated in FIG. 1; illustrated in FIG. 1.

Referring next to FIG. 2a, a computer system 110 suitable for executing the present invention may take the form of a conventional Macintosh or (E)ISA type computer. By way of example, the later may include a central processing unit (CPU) 312, a bi-directional memory bus 314 which couples the CPU to memory 316 and memory mapped peripherals 318, and a bi-directional peripheral bus 320 which connects the CPU to a variety of peripheral devices. The memory 314 typically takes the form of both read only memory (ROM) and random access memory (RAM). Memory mapped peripherals typically include video adapters and data storage devices. A variety of peripheral devices can be coupled to the peripheral bus 320. By way of example, peripherals devices that are frequently connected to the peripheral bus include a video card 322 which controls a display monitor 324, a Winchester type hard disc drive 326, a floppy disc drive 327 and/or CD ROM 328. Additionally, a keyboard 30 and a pointer device 32 such as a mouse or track ball are typically connected directly to the CPU 312. Both the keyboard and the pointer device are arranged to function as user input devices. As will be appreciated by those skilled in the art, a wide variety of other peripheral devices can be connected to either the peripheral bus or the memory bus and the buses which connect the described peripherals to the CPU can be switched and/or additional buses can be added.

As shown in FIG. 2b, a pen-based computer system 10 that may run the application programs that are having their data edited on computer system 110 will be briefly described. The pen-based computer system 110 includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 3.

Serial port 26 is coupled to I/O circuitry by a bi-directional bus 44. The serial port 26 can be used to couple the CPU to external devices and networks. Thus, conventional cabling may be used to couple the serial port to the serial port of a conventional desktop computer which runs the connection software. Infrared (I/R) port 28 is coupled to I/O circuitry by a bi-directional bus 46. The FR port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this coordination comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 3, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. An address book record 45 is displayed on the screen.

Although only one embodiment of the present invention has been described in detail, it should be understood that the present invention may be embodied in many other specific forms without departing from the spirit or scope of the invention. Particularly, the invention has been described in the context of a personal computer that is used to back up a PDA. However, it is not limited to such applications. Rather it can be applied to a variety of different systems where a first computer system is used to backup and/or edit application data from an application program intended for use in a second computer system, when the application program is incompatible with the first computer system. Therefore, the present examples are to be considered as illustrative and not restrictive, and the invention is not to be limited to the details given herein, but may be modified within the scope of the appended claims.

We claim:

1. A method of creating an editor that is executed on a first computer system, the editor being arranged to facilitate the editing of data from a first application program executed on a second computer system without requiring that the first application program run on the first computer system, the method comprising:

providing data produced by the first application program executing on the second computer system to the first computer system;

creating a display info array that identifies the data fields from the data produced by the first application program that may be displayed in a data browser window portion of the editor;

creating an edit info array that identifies the data fields from the data produced by the first application program that may be edited in a detail window portion of the editor; and producing the editor that executes on the first computer system to selectively edit the data produced by the execution of the first application program on the second computer system, the editor being produced in accordance with information in the display info array and edit info array.

2. A method of creating an editor as recited in claim 1 further comprising identifying validation scripts that define the types of data that may be accepted in the edit info array, wherein the validation scripts form a portion of the edit info array.

3. A method of creating an editor as recited in claim 1 further comprising creating an export info array that identifies the data fields that may be exported from the editor.

4. A method as recited in claim 3 further comprising providing a conversion mechanism for translating each of the data fields identified in the export info array to strings that are suitable for export from the editor to the second computer system.

5. A method as recited in claim 1 wherein said creating of the display info array and said edit info array are accomplished by executing the first application program on the second computer system, thereby permitting the dynamic creation of an editor suitable for running on said the computer system, and wherein the display info array and the edit info array may be transferred to said second computer system as part of a synchronizing step.

6. A method of editing data on a first computer system, the edited data being arranged to be used by a first application program executed on a second computer system without requiring that the first application program run on the first computer system, the method comprising:

creating a meta database on the first computer system and synchronizing the meta database with a database on the second computer system, the meta database having one or more records;

displaying an overview browser window of the records in the meta database on a screen of the first computer system when the meta database is selected, the data fields available for display in the overview browser window are identified in a display info array;

displaying a detail editing window of a selected record in the meta database on the screen of the first computer system, the selected record includes a plurality of data fields that are editable on the first computer system and are identified in an edit info array;

receiving edits inputted into the first computer system and changing the records in the meta database accordingly; and resynchronizing the meta database with the database on the second computer system to transfer to the first computer system at least the records in the meta database that have been changed.

* * * * *